J. P. BACHMAN.
DEVICE FOR TESTING THE SPREADING VALUE OF BAKING MATERIALS.
APPLICATION FILED AUG. 9, 1916.
1,222,590.
Patented Apr. 17, 1917.
2 SHEETS—SHEET 1.
Fig: 1.
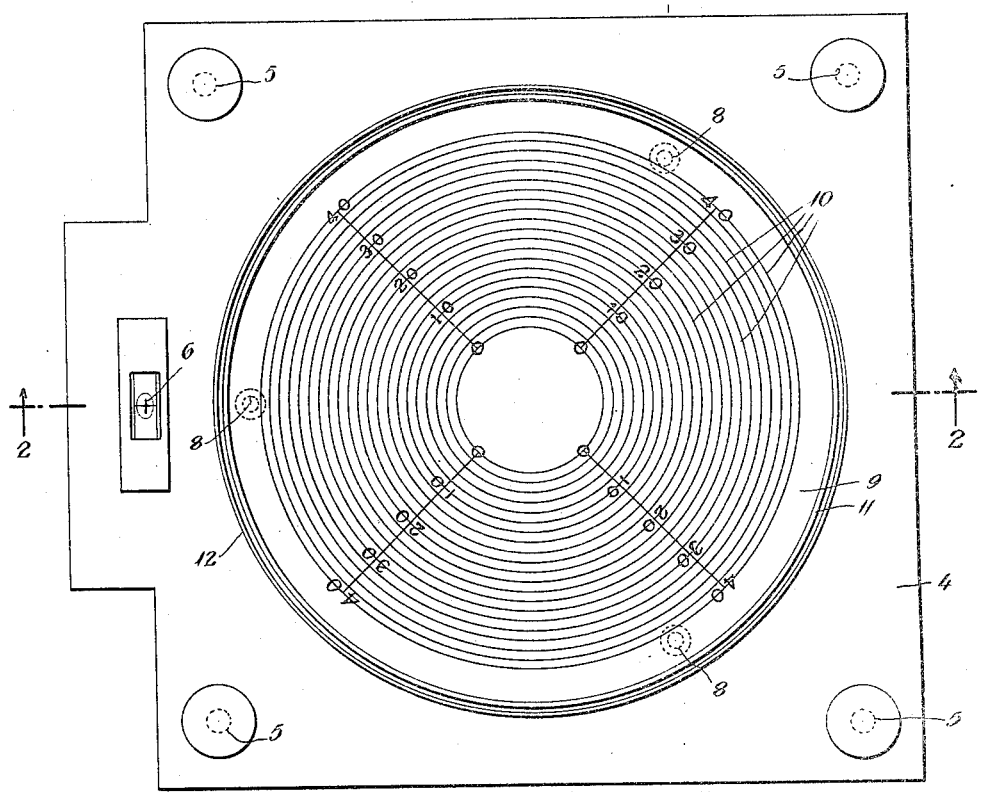
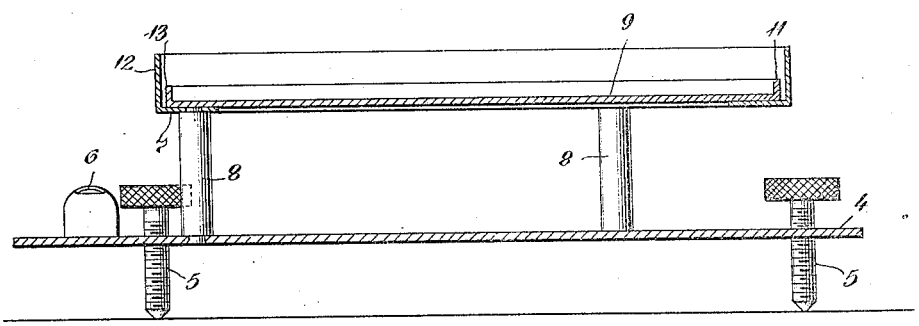
Fig: 2.
Inventor
Joseph P. Bachman.
By his Attorney

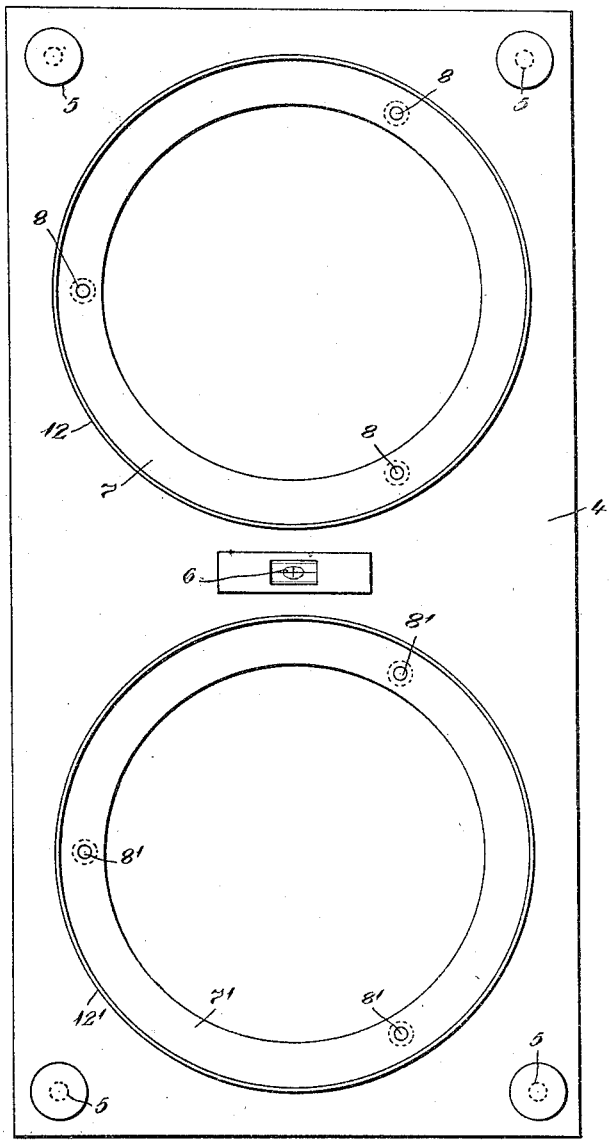

UNITED STATES PATENT OFFICE.

JOSEPH P. BACHMAN, OF NEWARK, NEW JERSEY.

DEVICE FOR TESTING THE SPREADING VALUE OF BAKING MATERIALS.

1,222,590.     Specification of Letters Patent.     Patented Apr. 17, 1917.

Application filed August 9, 1916. Serial No. 113,884.

*To all whom it may concern:*

Be it known that I, JOSEPH P. BACHMAN, a citizen of the United States, and a resident of Newark, in the county of Essex and State of New Jersey, have invented certain new and useful Improvements in Devices for Testing the Spreading Value of Baking Materials, of which the following is a specification.

In the production of doughs, especially those intended for cakes and biscuits, the commercial efficiency depends largely upon the ability of the dough to spread during the baking process.

In producing baked products of this class, the dough is made from flour, sugar, molasses, saccharine substances, fats, chemicals, and a liquid, such as water or milk, formed into approximately semi-globular forms and baked. During the process the various substances act upon the flour, resulting in the spreading of the dough and its formation into a baked product of a somewhat circular form.

It is evident that when the products are to be packed into uniform cartons or containers, it is important that all of the cakes be of the same size and shape, and that when they are sold in the usual loose condition it is advantageous that they present as large an appearance as possible. It is therefore the endeavor of the baker to produce them in a uniform large shape.

The spreading of the dough is dependent upon the sugar, molasses, saccharine substance or fat employed, each one having a spreading power different from that of the others, and in addition to this difference between the members of the various groups, the members of the same group vary from each other. For instance, it is a well-known fact that the different sugars possess different spreading powers, and the same is true of the other groups of products employed.

As the spreading power of these sugars, fats, and other chemicals does not depend upon their rotary power or the amount of moisture they contain, it is evident that the baker should possess some accurate practical method of testing the ingredients before employing them in a commercial way, in order to determine the exact proportions to use in order to obtain a baked product of his standard size.

The method at present employed for the determination of the spreading power of a material, is to use it in an ordinary baking operation, compare the result with the product desired and then roughly estimate or guess the increased or decreased amount of the material to be used to obtain the standard size. As a result of this unscientific testing method, several baking operations are necessary before the desired result is obtained.

My invention presents a device whereby the baker without any knowledge of chemistry may accurately and practically test the spreading value of the ingredients of his dough within a few minutes, the device indicating the exact amount of such chemicals he must employ to produce a baked product of a predetermined size.

I have found that the amount of spread is proportionate to the relative spreading power of the ingredients used and the object of my invention is a device whereby the amount of spread actually obtained by the baking process, compared with the spread of a standard ingredient, is an accurate guide to the amount of the spreading material which should be used to produce a baked product of the same size as that produced by the standard.

The value of this device is evident as it enables the baker to accurately estimate the amount of the spreading material he must use to produce a standard size, without the expense of material and waste of time incident to the present employed method.

In order that the spread of the product during baking may be practically uniform it is essential that the dough-carrying tray be maintained in a horizontal position, and it be subjected to a uniform heat in all parts.

For convenience, I prefer to use a device comprising two trays upon a common base, one for the standard dough and one for the dough to be tested, but it is evident that two separate trays may be employed.

Two modifications of my device are shown in the accompanying drawings in which similar parts are designated by similar numerals.

Figure 1 illustrates a top view of one form of my invention.

Fig. 2 is a cross-section through the line 2—2 of Fig. 1.

Fig. 3 is a top view of another form of my invention, with the trays removed.

The table 4 carries the four adjustable threaded legs 5, 5, 5, 5, threaded into threaded holes, and capable of placing the table 4 into an accurately level position, which position may be determined by means of the liquid level 6. The angled annular tray support 7, is supported upon the table 4 by means of the legs 8, 8, 8 which are permanently attached to the table 4 and the annular support 7. The tray 9 is removably carried by the annular support 7. The upper surface of the tray 9 carries a series of concentric marks or gagings 10, a space 13 being allowed between the rim 11 of the tray 9 and the upturned edge 12 of the annular support 7; this space acting as a means to prevent the warping of the tray 9 during the baking process.

In Fig. 3 a modification of my device is shown in which the table 4 is enlarged so as to carry two annular supports 7, 12, 7', 12'. In this view the trays are removed for clearness of explanation, but it is to be understood that each support 7, 12 and 7', 12' carries a gage marked tray similar to the tray 9 of Figs. 1 and 2.

In use, two devices similar to that disclosed in Fig. 1, or one device similar to that disclosed in Fig. 3, may be employed.

The method of use is as follows:

25 grams of a dough made from standard materials are placed in a semi-globular form upon the center of one tray 9, so as to cover the ungaged portion, and a like amount of dough made with the material to be tested is placed in a similar form upon the center of another tray 9. The devices are then placed in the oven and baked, care being taken to manipulate the legs 5, 5, 5, 5, so that the support 7, 12 and the tray 9 are in an absolutely level position, in order that the dough may spread in an approximately uniform manner. The space between the table 4 and the tray 9 allows of a uniform heat upon all portions of the lower surface of the tray 9. During the baking the standard and the sample dough spread under the actual conditions of baking, and when completed the amount of spread is noted relative to the gage markings on the tray 9. These markings are so arranged as to be a correct reading of the spreading effect. If, for instance, the standard spreads to the gage mark 10 and the sample spreads to the gage mark 20, it is evident that twice as much of the spreading material has been used in the sample as is necessary to produce a cake of the size of the standard, and hence, in practice, one-half as much of the spreading material being tested may be used as is employed with the spreading material of the standard.

I do not limit myself to the size, shape, number or arrangements as described and shown, as they may all be varied without going beyond the scope of my invention as described and claimed.

What is claimed, is:

1. In a device of the character specified, in combination, at least one tray, said tray carrying markings indicating the proportionate amount of spread of a material placed thereon, adjustable means for supporting said tray in a horizontal position, and means whereby air may have free access to both the top and bottom of the tray.

2. In a device of the character specified, in combination, at least one non-corrugated tray, said tray carrying concentric markings, the markings having indicia indicating the proportion of spread of a material placed thereon, and means whereby air may have free access to both the top and bottom of the tray.

3. In a device of the character specified, in combination, at least one tray carrying concentric gage markings, a platform, a supporting member upon the platform removably carrying the tray, said tray and the platform being so situated as to allow an air space between them, and adjustable means for maintaining said tray in a horizontal position.

Signed at New York city, in the county of New York and State of New York this third day of August, 1916.

JOSEPH P. BACHMAN.

Witnesses:
JACOB TANNENBAUM,
LOUIS L. DOWNING.